US008248665B2

(12) United States Patent  
Chiken

(10) Patent No.: US 8,248,665 B2  
(45) Date of Patent: Aug. 21, 2012

(54) INFORMATION PROCESSING DEVICE, PRINTING DEVICE, INFORMATION PROCESSING SYSTEM, METHOD, COMPUTER-READABLE MEDIUM, AND COMPUTER DATA SIGNAL

(75) Inventor: Kunihiko Chiken, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 483 days.

(21) Appl. No.: 12/129,783

(22) Filed: May 30, 2008

(65) Prior Publication Data

US 2009/0141313 A1   Jun. 4, 2009

(30) Foreign Application Priority Data

Nov. 30, 2007   (JP) ................... 2007-310604

(51) Int. Cl.  
*H04N 1/40* (2006.01)
(52) U.S. Cl. ............... 358/3.28; 358/1.1; 358/1.9
(58) Field of Classification Search ............ 358/1.1, 358/1.9, 3.28; 235/462.01, 462.08, 462.09, 235/462.11  
See application file for complete search history.

(56) References Cited

U.S. PATENT DOCUMENTS

| 7,287,698 | B2 | 10/2007 | Barrus |
| 7,523,864 | B2* | 4/2009 | Manheim ............... 235/462.01 |
| 2006/0098234 | A1 | 5/2006 | Tani et al. |
| 2007/0176000 | A1* | 8/2007 | Cattrone et al. ......... 235/462.01 |
| 2007/0199992 | A1 | 8/2007 | Manheim |
| 2008/0078836 | A1* | 4/2008 | Tomita .................. 235/462.11 |

FOREIGN PATENT DOCUMENTS

| JP | 11231990 | 8/1999 |
| JP | 2005157928 | 6/2005 |
| JP | 2006130801 | 5/2006 |

OTHER PUBLICATIONS

Office Action issued on Nov. 4, 2009, in connection with corresponding Australian Application No. 2008202785.  
Chinese Office Action with English translation thereof issued in Chinese Application No. 200810135857.9. Issued on Jun. 9, 2011.

* cited by examiner

*Primary Examiner* — Thomas D Lee  
(74) *Attorney, Agent, or Firm* — Gesmer Updegrove LLP

(57) ABSTRACT

An information processing device includes: a document information receiving unit that receives document information; a placement region determining unit that selects a region from the document information and determines the region as a placement region where code information is to be placed, on the basis of the amount of information of a part of the document information; a code information generating unit that encodes additional information to be added to the document information and information for the placement region and generates code information; and a document information generating unit that generates code-information-bearing document information in which the code information is placed in the placement region of the document information.

6 Claims, 7 Drawing Sheets

INFORMATION PROCESSING DEVICE, PRINTING DEVICE, INFORMATION PROCESSING SYSTEM, METHOD, COMPUTER-READABLE MEDIUM, AND COMPUTER DATA SIGNAL

CROSS-REFERENCE TO RELATED APPLICATIONS

This application is based on and claims priority under 35 USC 119 from Japanese Patent Application No. 2007-310604 filed on Nov. 30, 2007.

BACKGROUND

1. Technical Field

The present invention relates to an information processing device, a printing device, an information processing system, a method, a computer-readable medium, and a computer data signal.

2. Related Art

A technique is known for adding code information such as a two-dimensional code to document information and generating code-information-bearing document information.

SUMMARY

According to an aspect of the invention, there is provided an information processing device including: a document information receiving unit that receives document information; a placement region determining unit that selects a region from the document information and determines the region as a placement region where code information is to be placed, on the basis of the amount of information of a part of the document information; a code information generating unit that encodes additional information to be added to the document information and information for the placement region and generates code information; and a document information generating unit that generates code-information-bearing document information in which the code information is placed in the placement region of the document information.

BRIEF DESCRIPTION OF THE DRAWINGS

Exemplary embodiments of the present invention will be described in detail based on the following figures, wherein.

DETAILED DESCRIPTION

An exemplary embodiment of the present invention will be described below with reference to the drawings.

[Configuration of Information Processing System]

Figure 1:
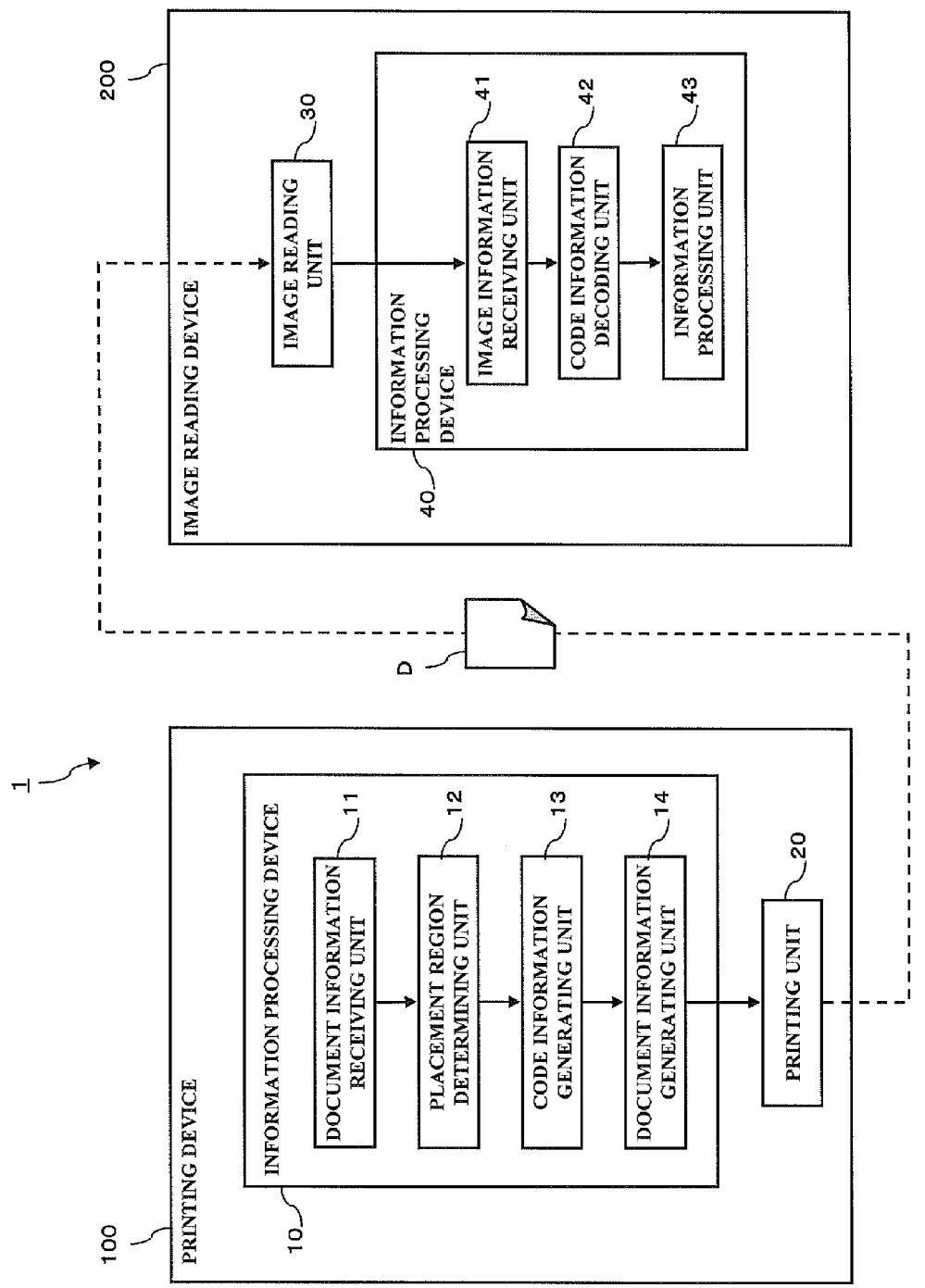
FIG. 1 is a block diagram showing an example of the configuration of an information processing system according to an exemplary embodiment.

FIG. 1 is a block diagram showing an example of the configuration of an information processing system 1 according to an exemplary embodiment. In FIG. 1, the information processing system 1 has a printing device 100 and an image reading device 200.

The printing device 100 adds code information such as a two-dimensional code to document information, and prints out a resultant code-information-bearing document.

The image reading device 200 reads the code-information-bearing document output by the printing device 100 and generates image information. The image reading device 200 decodes the code information in the image information and performs a predetermined process on the basis of information obtained by the decoding.

Note that the printing device 100 and image reading device 200 may be implemented using physically separate devices or may be implemented using one device. In one aspect, the printing device 100 and image reading device 200 are implemented using a multifunction machine with a printing function and an image reading function.

[Configuration of Printing Device]

Referring to FIG. 1, the printing device 100 has an information processing device 10 and a printing unit 20.

The information processing device 10 adds code information to document information and generates code-information-bearing document information. In one aspect, the information processing device 10 is implemented by cooperation between hardware resources and software. An example of the information processing device 10 is a computer. More specifically, the functions of the information processing device 10 are implemented when an information processing program recorded on a recording medium is loaded into main memory and is executed by a CPU (Central Processing Unit). The above-described information processing program may be recorded on a computer-readable recording medium such as a CD-ROM and be provided, or may be provided as data signals through communication. Note that the functions of the information processing device 10 may instead be implemented by hardware alone.

The information processing device 10 has a document information receiving unit 11, a placement region determining unit 12, a code information generating unit 13, and a document information generating unit 14.

The document information receiving unit 11 receives document information to be processed. The document information is information (specifically electronic data) representing characters, graphics, images, and the like. Examples of the document information include data for various application software programs, such as word-processing software and spreadsheet software, and image data.

The placement region determining unit 12 selects a region from the document information received by the document information receiving unit 11 and determines the region as a placement region where code information is to be placed, on the basis of the amounts of information for parts (or regions) of the document information. The processing of the placement region determining unit 12 will be described in detail later.

The code information generating unit 13 encodes additional information to be added to the above-described document information and information for the region determined as the placement region by the placement region determining unit 12 and generates code information by encoding.

Examples of the above-described additional information include, but are not limited to, information indicating a storage destination and the attribute information of the document information.

The above-described information for the placement region is information present in the placement region of the document information. The information is hidden when the code information is placed in the document information.

Examples of the above-described code information include a two-dimensional code such as a QR code (Quick Response code) and a one-dimensional barcode.

The document information generating unit 14 generates code-information-bearing document information in which the code information generated by the code information generating unit 13 is placed in the placement region of the document information.

The printing unit 20 prints the code-information-bearing document information generated by the document information generating unit 14 and outputs a code-information-bearing document D. For example, the printing unit 20 prints the code-information-bearing document on a paper sheet by, e.g., electrophotography or an ink-jet printing method and outputs a paper code-information-bearing document.

Note that from a physical point of view, the printing device 100 may be implemented using one device or may be implemented using plural devices.

[Configuration of Image Reading Device]

Referring to FIG. 1, the image reading device 200 has an image reading unit 30 and an information processing device 40.

The image reading unit 30 reads the code-information-bearing document output by the printing device 100 and generates image information. The image reading unit 30 optically reads the paper code-information-bearing document by, e.g., a platen scanning method or sheet-through scanning method and generates electronic image information.

In one aspect, a code-information-bearing document to be read by the image reading unit 30 contains hand-written information input by a user.

The information processing device 40 decodes the code information in the image information generated by the image reading unit 30 and performs a predetermined process on the basis of information obtained by the decoding. In one aspect, the information processing device 40 is implemented by cooperation between hardware resources and software. An example of the information processing device 40 is a computer. More specifically, the functions of the information processing device 40 are implemented when an information processing program recorded on a recording medium is loaded into the main memory and is executed by the CPU. The above-described information processing program may be recorded on a computer-readable recording medium such as a CD-ROM and be provided, or may be provided as data signals through communication. Note that the functions of the information processing device 40 may instead be implemented by hardware alone.

The information processing device 40 has an image information receiving unit 41, a code information decoding unit 42, and an information processing unit 43.

The image information receiving unit 41 receives the image information generated by the image reading unit 30.

The code information decoding unit 42 decodes the code information in the image information received by the image information receiving unit 41 and acquires the additional information and the information for the placement region.

The information processing unit 43 performs the predetermined process on the basis of the additional information or the information for the placement region acquired by the code information decoding unit 42.

In one aspect, the information processing unit 43 places the information for the placement region obtained from the code information in a region where the code information of the image information obtained by the reading is placed and generates image information with the information for the placement region restored. For example, the information processing unit 43 erases the code information from the image information obtained by the reading and places, in the region having had the code information placed therein, the information for the placement region obtained from the code information (i.e., the information originally placed in the region), thereby generating the image information with the information for the placement region restored. In one aspect of this aspect, the information processing unit 43 stores the image information with the information for the placement region restored in a storage destination indicated by the additional information obtained from the code information. Examples of the storage destination include a specific storage location in a document management server connected to the information processing device 40 via a communication channel (a LAN, the Internet, or the like).

Note that from a physical point of view, the image reading device 200 may be implemented using one device or may be implemented using plural devices.

[Operation of Information Processing System]

Figure 2:
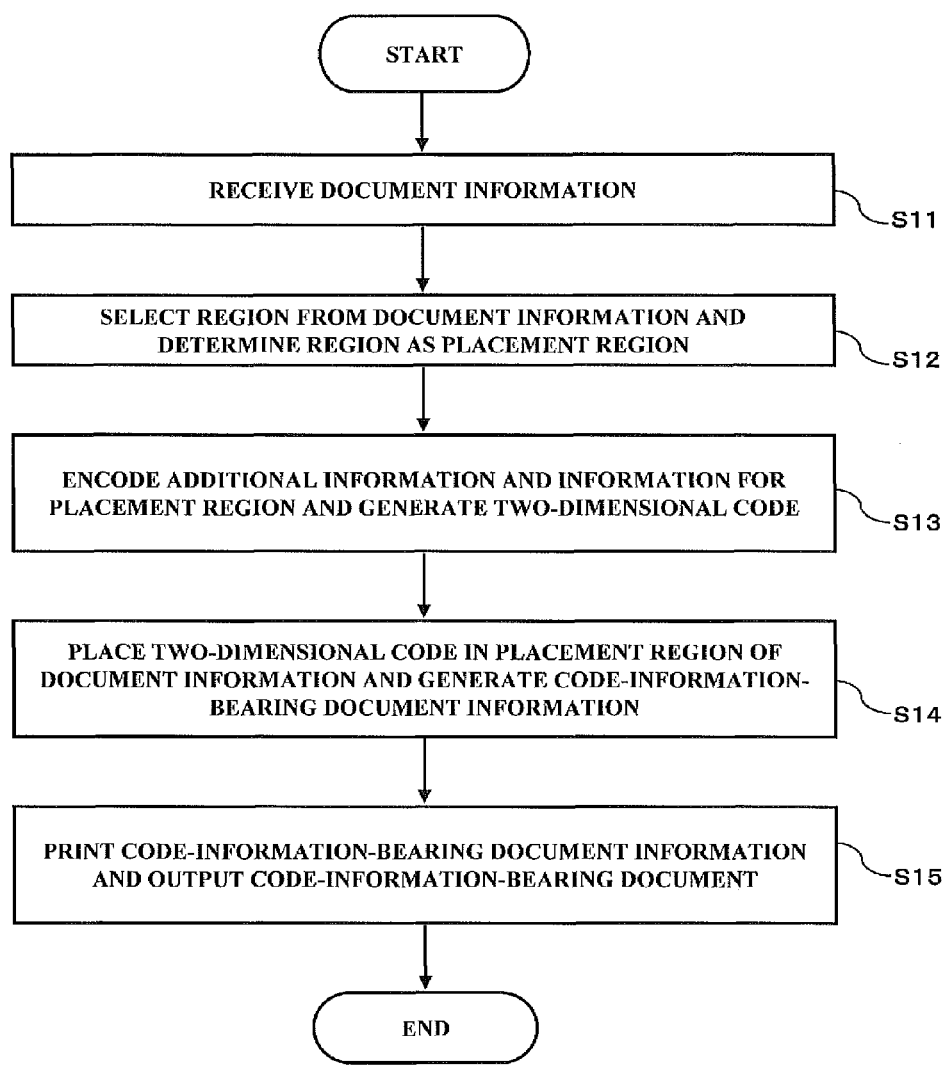
FIG. 2 is a flow chart showing an example of the operating procedure for a printing device.
Figure 3:
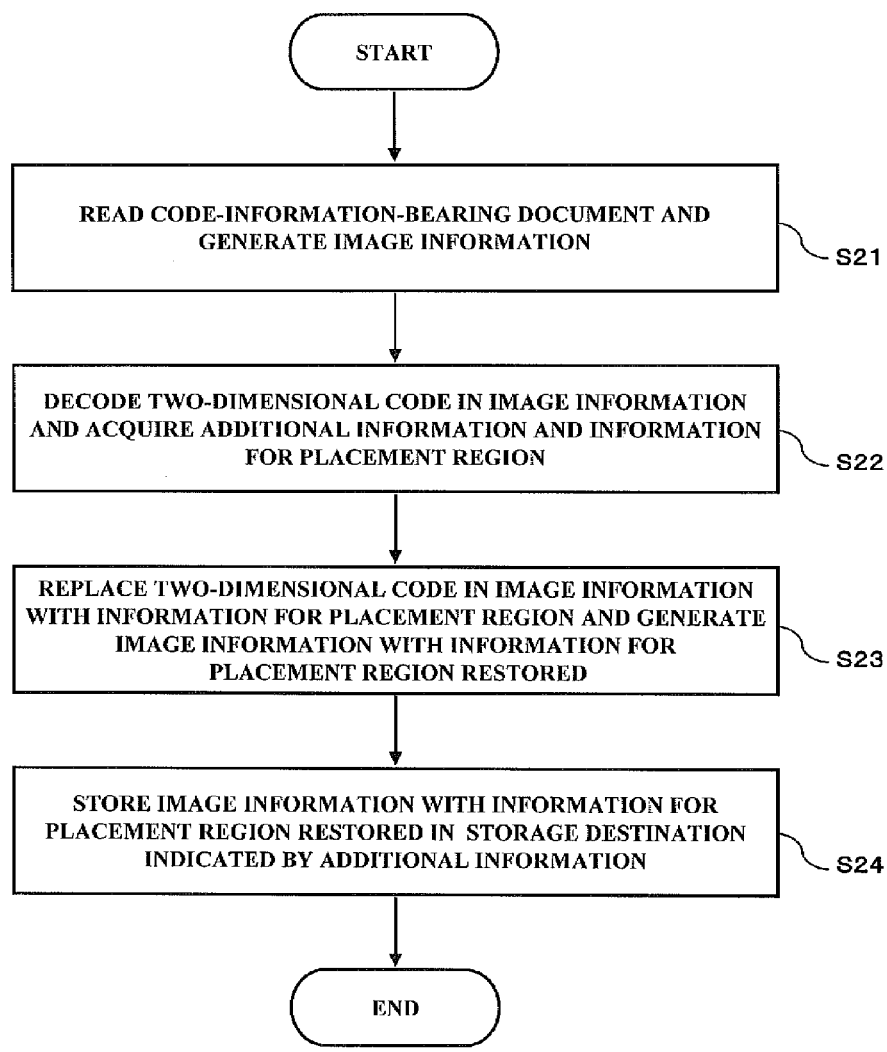
FIG. 3 is a flow chart showing an example of the operating procedure for an image reading device.
Figure 4:
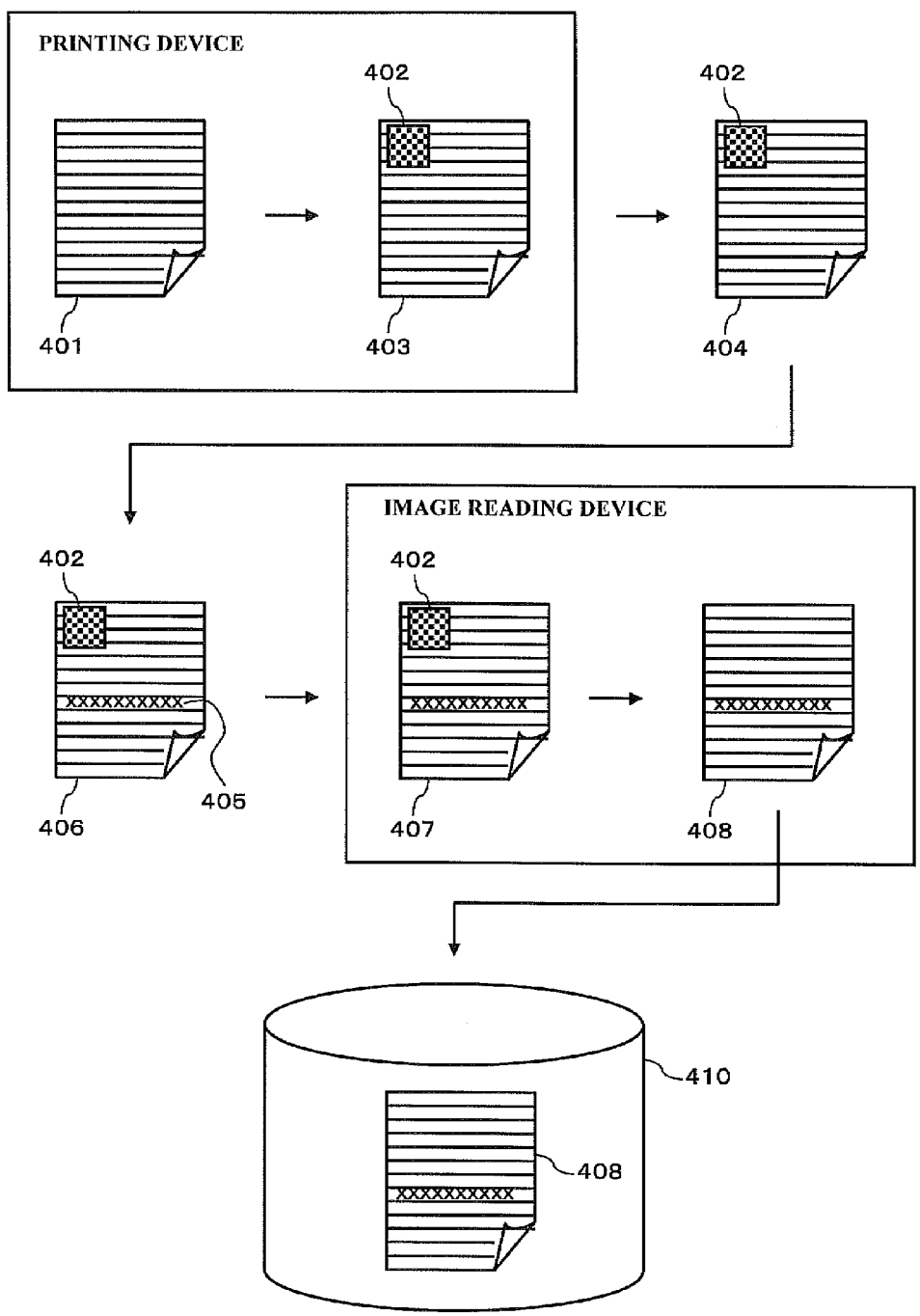
FIG. 4 is a view for explaining the operation of the information processing system.

FIG. 2 is a flow chart showing an example of the operating procedure for the printing device 100. FIG. 3 is a flow chart showing an example of the operating procedure for the image reading device 200. FIG. 4 is a view for explaining the operation of the information processing system 1. The operation of the information processing system 1 will be described below with reference to FIGS. 2 to 4.

Referring to FIGS. 2 and 4, the printing device 100 receives an electronic document 401 as document information to which code information is to be added (S11).

The printing device 100 selects a region from the electronic document 401 and determines the region as a placement region for placing code information, on the basis of the amounts of information for parts (or regions) of the electronic document 401 (S12). The process in step S12 will be described in detail later.

The printing device 100 encodes additional information to be added to the electronic document 401 and information for the placement region and generates a two-dimensional code 402 (S13). The additional information here includes information indicating a storage destination.

The printing device 100 places the two-dimensional code 402 in the placement region of the electronic document 401 and generates an electronic document 403 which is code-information-bearing document information (S14).

The printing device 100 prints the electronic document 403 on a paper sheet and outputs a paper document 404 which is a code-information-bearing document (S15). In the paper document 404, the contents of the electronic document 401 have been visualized. However, an image as the two-dimensional code 402 is placed in the placement region, and the contents of the placement region in the electronic document 401 have not been visualized.

A user adds hand-written information 405 to the paper document 404 output by the printing device 100 and sets a paper document 406 containing the hand-written information 405 in the image reading device 200. Note that the hand-written information 405 may not be added.

Referring to FIGS. 3 and 4, the image reading device 200 reads the set paper document 406 and generates an electronic image 407 which is image information representing an image of the paper document 406 (S21).

The image reading device 200 extracts the two-dimensional code 402 from the electronic image 407, decodes the two-dimensional code 402, and acquires the additional information and the information for the placement region (S22).

The image reading device 200 erases the two-dimensional code 402 from the electronic image 407 and places the acquired information for the placement region in the region having had the two-dimensional code 402 placed therein, thereby generating an electronic image 408 with the information for the placement region restored (S23). The electronic image 408 represents an image obtained by adding an image of the hand-written information 405 to an image of the original electronic document 401.

The image reading device 200 stores the electronic image 408 in a storage device as the storage destination indicated by the acquired additional information (S24). For example, the image reading device 200 sends the electronic image 408 to a document management server 410 on a network while notifying the document management server 410 of the storage destination as a designated storage destination, and the document management server 410 stores the electronic image 408 in the designated storage destination.

[Processing of Placement Region Determining Unit]

The processing of the placement region determining unit 12 will be described below.

In one aspect, the placement region determining unit 12 determines a placement region such that the size of code information generated by the code information generating unit 13 is minimum, in order to reduce information hidden by code information, i.e., suppress a reduction in readability caused by code information. More specifically, the placement region determining unit 12 searches in document information for a region where the size of code information is minimum and determines a found region as the placement region.

In one aspect of the one aspect, the placement region determining unit 12 performs a search process of searching in the document information for a region where code information of a predetermined criterial size can be placed. If no region is found, the placement region determining unit 12 increases the value of the criterial size and repeats the search process. On the other hand, if a region is found, the placement region determining unit 12 determines the found region as the placement region.

For example, assume a configuration in which information for a placement region is reduced and encoded if the total amount of additional information and the information for a placement region exceeds the capacity of code information. In this configuration, the larger the amount of information for the placement region, the larger an amount by which the information for the placement region is reduced, and the lower the reproducibility of the information for the placement region. For this reason, in one aspect, the placement region determining unit 12 determines, as a placement region, one of parts (or regions) of document information where the amount of information is minimum, in order to satisfactorily reproduce information for the placement region. More specifically, the placement region determining unit 12 searches in the document information for a region where the amount of information is minimum and determines a found region as the placement region.

Figure 5:
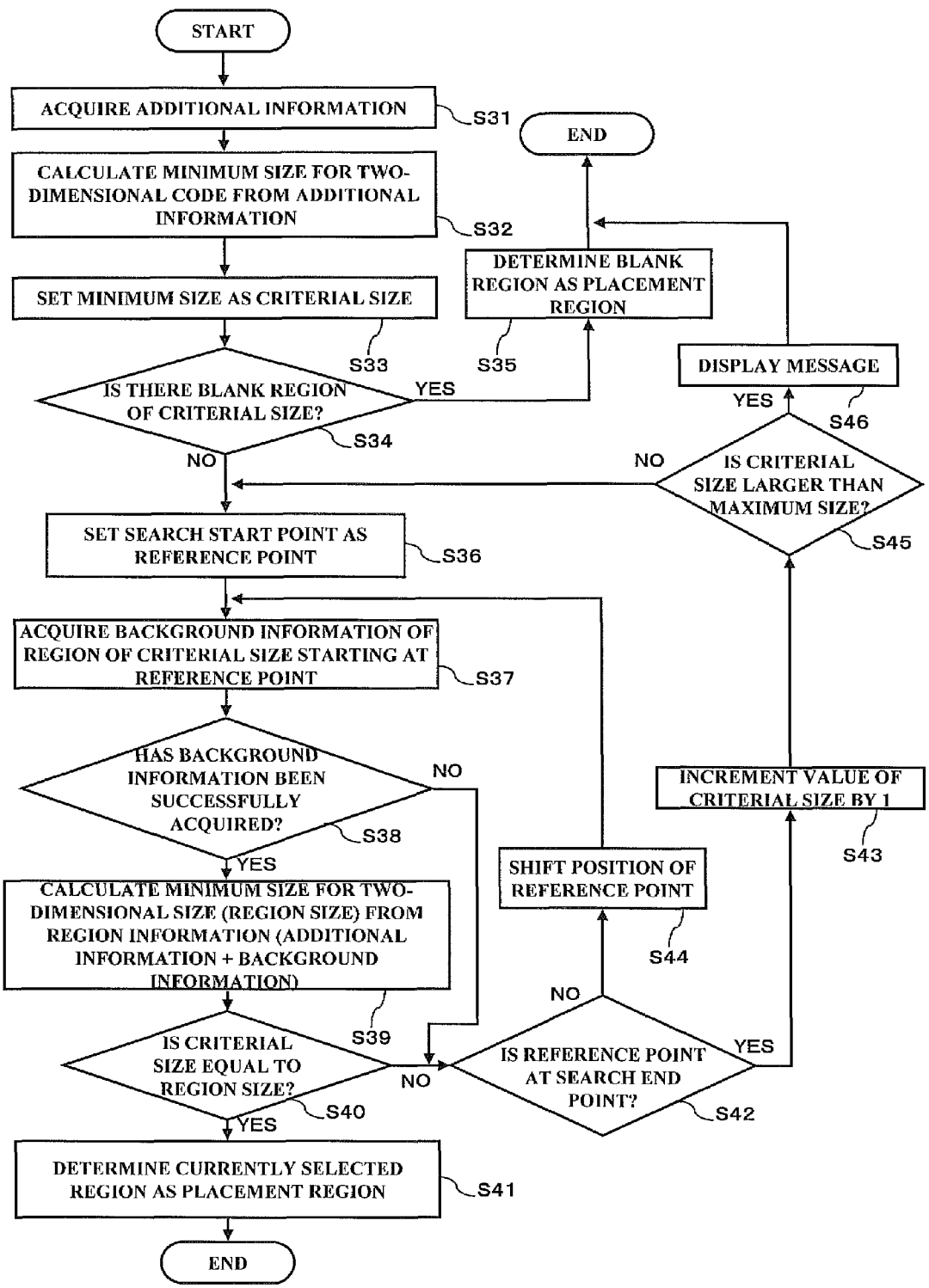
FIG. 5 is a flow chart showing a first example of the processing of a placement region determining unit.

FIG. 5 is a flow chart showing a first example of the processing of the placement region determining unit 12. An example of the processing of the placement region determining unit 12 in a case where the size of code information is variable will be described below with reference to FIG. 5.

In step S31, the placement region determining unit 12 acquires additional information and advances to step S32.

In step S32, the placement region determining unit 12 calculates a minimum size for a two-dimensional code from the additional information, using a QR code generating tool or the like, and advances to step S33. The minimum size for a two-dimensional code here is one of plural sizes for a two-dimensional code which is the smallest size that allows storage of the additional information In step S33, the placement region determining unit 12 sets the calculated minimum size as a criterial size and advances to step S34.

In step S34, the placement region determining unit 12 determines whether there is a blank region of the criterial size in document information to which a two-dimensional code is to be added. If it is determined that there is a blank region (YES in S34), the placement region determining unit 12 advances to step S35. Otherwise (NO in S34), the placement region determining unit 12 advances to step S36.

In step S35, the placement region determining unit 12 determines, as a placement region, a blank region found in the document information and ends the processing.

In step S36, the placement region determining unit 12 sets a search start point (e.g., coordinates at the upper left corner of the document information) as a reference point and advances to step S37.

In step S37, the placement region determining unit 12 acquires information for a region of the criterial size starting at the reference point (hereinafter referred to as "background information") from the document information and advances to step S38. An example of the region of the criterial size starting at the reference point is a rectangular region whose upper left vertex is at the reference point. Examples of the background information include information indicating the background color of the region (e.g., a color code), information indicating a character string contained in the region (e.g., a character code string), information indicating the font of the character string, information indicating the character size of the character string, information indicating the start point of the character string, and information indicating a graphic contained in the region (e.g., the coordinate values of the ends of a line segment). Note that information obtained by combining the additional information and the background information will be referred to as "region information" in the following description.

In step S38, the placement region determining unit 12 determines whether the background information has been successfully acquired. If the background information has been successfully acquired (YES in S38), the placement region determining unit 12 advances to step S39. Otherwise (NO in S38), the placement region determining unit 12 advances to step S42. Examples of a case where the background information cannot be successfully acquired include a case where a part of a character lies off the region of the criterial size.

In step S39, the placement region determining unit 12 calculates a minimum size for a two-dimensional code from the region information, using a QR code generating tool or the like, and advances to step S40. The minimum size for a two-dimensional code here is one of the plural sizes for a two-dimensional code which is the smallest size that allows storage of the region information. Note that the minimum size will be referred to as "the region size" in the following description.

In step S40, the placement region determining unit 12 determines whether the criterial size is equal to the region size. If the sizes are equal (YES in S40), the placement region determining unit 12 advances to step S41. Otherwise (NO in S40), the placement region determining unit 12 advances to step S42.

In step S41, the placement region determining unit 12 determines, as the placement region, the region of the size currently set as the criterial size starting at the point currently set as the reference point and ends the processing.

In step S42, the placement region determining unit 12 determines whether the point currently set as the reference point is at a search end point (e.g., coordinates at the lower right corner of the document information). If the point is at the search end point (YES in S42), the placement region determining unit 12 advances to step S43. Otherwise (NO in S42), the placement region determining unit 12 advances to step S44.

In step S43, the placement region determining unit 12 newly determines, as the criterial size, a size larger by one level than the size currently set as the criterial size (i.e., increases the value of the criterial size by one level) and advances to step S45.

In step S44, the placement region determining unit 12 newly sets, as the reference point, a point next to the point currently set as the reference point (i.e., shifts the position of the reference point) and returns to step S37.

In step S45, the placement region determining unit 12 determines whether the criterial size exceeds a maximum size for a two-dimensional code. If the criterial size exceeds the maximum size (YES in S45), the placement region determining unit 12 advances to step S46. Otherwise (NO in S45), the placement region determining unit 12 returns to step S36.

In step S46, the placement region determining unit 12 displays, on a screen, a message to the effect that a region to be determined as the placement region is not found and ends the processing.

Figure 6:
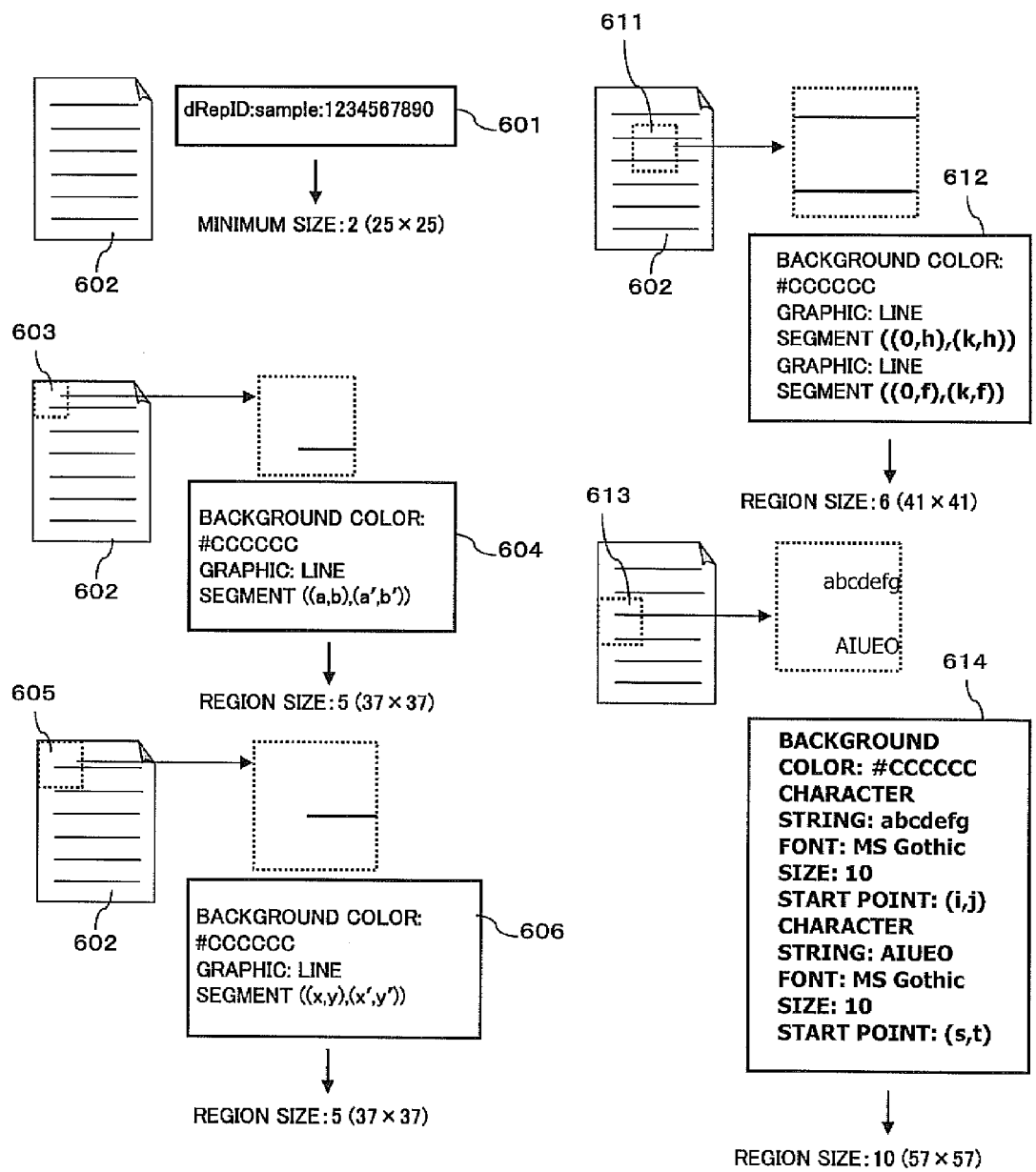
FIG. 6 is a view for explaining a specific example of the first example shown in FIG. 5.

FIG. 6 is a view for explaining a specific example of the first example. The specific example of the first example will be described below with reference to FIG. 6.

(1) The placement region determining unit 12 calculates a minimum size for a two-dimensional code from additional information 601 and determines the minimum size as a criterial size. In the example in FIG. 6, the minimum size is calculated to be at size level 2 (25×25 pixels), and the criterial size is set to size level 2.

(2) The placement region determining unit 12 determines whether there is a blank region of the criterial size in document information 602. In this example, it is determined that there is no blank region.

(3) The placement region determining unit 12 sets coordinates (0,0) in the document information 602 as a reference point and acquires background information 604 that is information for a region 603 of the criterial size whose upper left vertex is at the reference point.

(4) The placement region determining unit 12 calculates a region size from region information obtained by combining the additional information 601 and background information 604. In the example in FIG. 6, the region size is calculated to be at size level 5 (37×37 pixels).

(5) The placement region determining unit 12 determines whether the criterial size is equal to the region size. Since the two sizes are not equal, the placement region determining unit 12 shifts the position of the reference point and performs acquisition of background information, calculation of the region size, and size comparison again. In this example, even if the position of the reference point is shifted to a search end point, the criterial size does not become equal to the region size.

(6) The placement region determining unit 12 repeats the processes of (3) to (5) while increasing the value of the criterial size. In this example, when the criterial size is set at size level 3 or 4, the criterial size does not become equal to the region size.

(7) In this example, when the criterial size reaches size level 5, background information 606 is acquired from a region 605 of the criterial size, and the region size is calculated to be at size level 5 from region information obtained by combining the additional information 601 and background information 606. The criterial size becomes equal to the region size.

(8) The placement region determining unit 12 determines, as a placement region, the region 605 where the criterial size is equal to the region size.

Note that examples where the criterial size is at size level 5, and the region size is calculated for a region at another position, are shown on the right side of FIG. 6. Referring to the right side of FIG. 6, background information 612 is acquired from a region 611 of the criterial size, and the region size is calculated to be at size level 6 (41×41 pixels) from region information obtained by combining the additional information 601 and background information 612. Background information 614 is acquired from a region 613 of the criterial size, and the region size is calculated to be at size level 10 (57×57 pixels) from region information obtained by combining the additional information 601 and background information 614.

Figure 7:
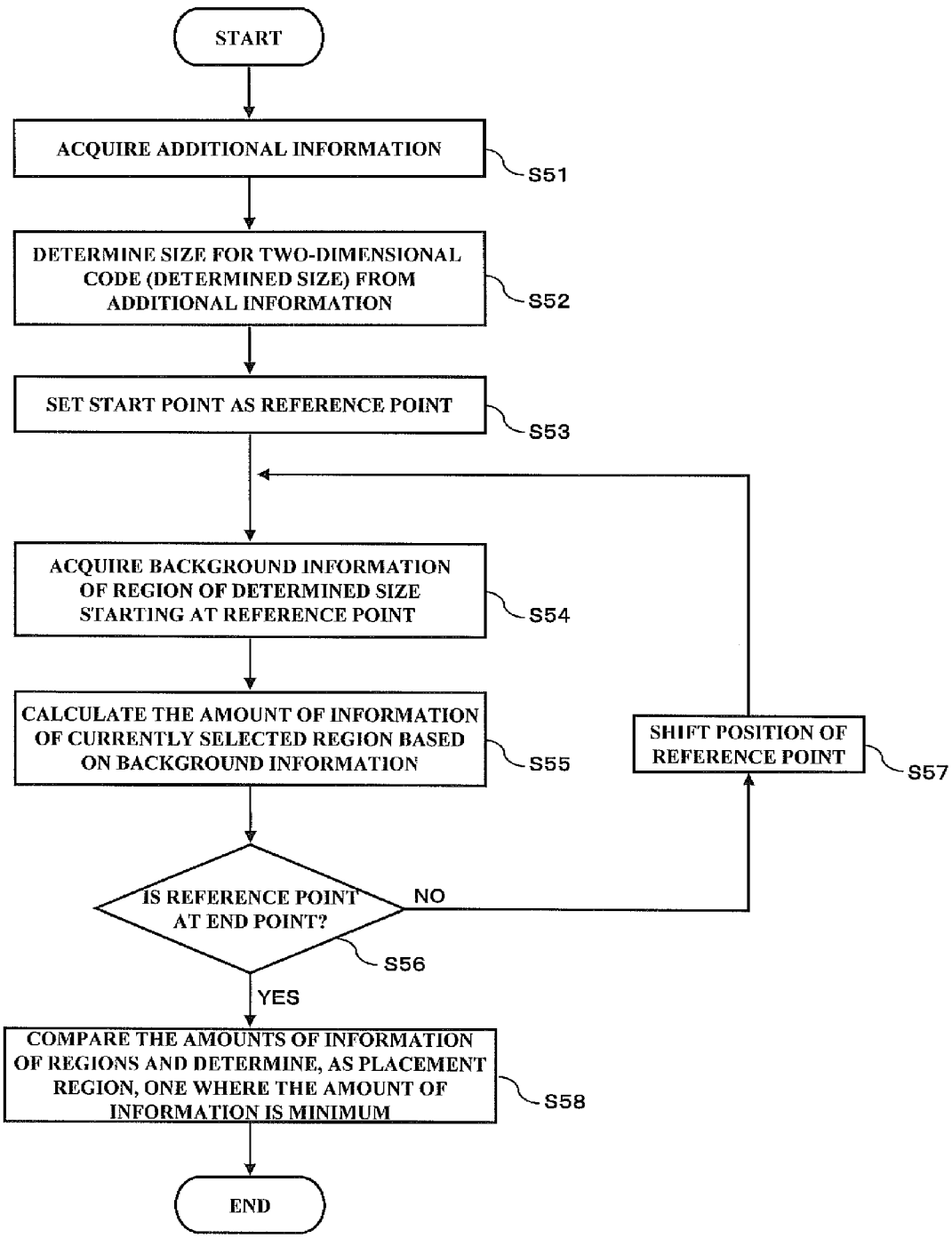
FIG. 7 is a flow chart showing a second example of the processing of the placement region determining unit.

FIG. 7 is a flow chart showing a second example of the processing of the placement region determining unit 12. An example of the processing of the placement region determining unit 12 in a case where the size of code information is fixed will be described below with reference to FIG. 7.

In step S51, the placement region determining unit 12 acquires additional information and advances to step S52.

In step S52, the placement region determining unit 12 determines a size for a two-dimensional code on the basis of the amount of information obtained by adding a predetermined information amount to the amount of information of the additional information and advances to step S53. The size determined will be referred to as "the determined size" in the following description.

In step S53, the placement region determining unit 12 sets a start point (e.g., coordinates at the upper left corner of document information) as a reference point and advances to step S54.

In step S54, the placement region determining unit 12 acquires information for a region of the determined size starting at the reference point (hereinafter referred to as "background information") from the document information and advances to step S55. An example of the region of the determined size starting at the reference point is a rectangular region whose upper left vertex is at the reference point.

In step S55, the placement region determining unit 12 calculates the amount of information of the region of the determined size starting at the point currently set as the reference point on the basis of the background information and advances to step S56.

In step S56, the placement region determining unit 12 determines whether the point currently set as the reference point is not at an end point (e.g., coordinates at the lower right corner of the document information). If the point is at the end point (NO in S56), the placement region setting unit 12 advances to step S57. Otherwise (YES in S56), the placement region setting unit 12 advances to step S58.

In step S57, the placement region determining unit 12 newly sets, as the reference point, a point next to the point currently set as the reference point (i.e., shifts the position of the reference point) and returns to step S54.

In step S58, the placement region determining unit 12 compares the amounts of information of the regions calculated in step S55, determines, as a placement region, one of the regions where the amount of information is minimum, and ends the processing.

In the second example, if the total amount of information of the additional information and the information for the placement region exceeds the capacity of a two-dimensional code of the determined size, the code information generating unit 13 reduces the information for the placement region (by, e.g., omitting information on font and color and the like) and generates a two-dimensional code of the determined size.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a document information receiving unit that receives document information;
   a placement region determining unit that selects a region from the document information to be a placement region where code information is to be placed;
   a code information generating unit that encodes additional information to create code information to be placed within the determined placement; and
   a document information generating unit that generates code-information-bearing document information in which the code information is placed in the placement region of the document information;
   said placement region determining unit determining a criterial size, associated with the code information created by encoding the additional information, by calculating a size needed to place code information created by encoding the additional information in the document information;
   said placement region determining unit determining if there is a blank region in the document information that is equal to or greater than the determined criterial size;
   said placement region determining unit selecting the blank region to be the placement region when the size of the blank region is equal to or greater than the determined criterial size;
   said placement region determining unit selecting another non-blank region in the document information, when the blank region is less than the determined criterial size, and determining a region size, associated with the non-blank region, by calculating a size needed to place code information created by encoding the additional information and code information created by encoding background information acquired from the non-blank region in the document information;
   said placement region determining unit selecting the non-blank region to be the placement region when the region size is equal to or greater than the determined criterial size.

2. The information processing device according to claim 1, wherein the placement region determining unit performs a search process of searching for a non-blank region where code information associated with the criterial size can be placed, increases a value of the criterial size, and repeats the search process if the non-blank region is not found, and determines the non-blank region as the placement region if the non-blank region is found.

3. A printing device comprising:
   a document information receiving unit that receives document information;
   a placement region determining unit that selects a region from the document information to be a placement region where code information is to be placed;
   a code information generating unit that encodes additional information to create code information to be placed within the determined placement region;
   a document information generating unit that generates code-information-bearing document information in which the code information is placed in the placement region of the document information; and
   a printing unit that prints the generated code-information-bearing document information and outputs a code-information-bearing document;
   said placement region determining unit determining a criterial size, associated with the code information created by encoding the additional information, by calculating a size needed to place code information created by encoding the additional information in the document information;
   said placement region determining unit determining if there is a blank region in the document information that is equal to or greater than the determined criterial size;
   said placement region determining unit selecting the blank region to be the placement region when the size of the blank region is equal to or greater than the determined criterial size;
   said placement region determining unit selecting another non-blank region in the document information, when the blank region is less than the determined criterial size, and determining a region size, associated with the non-blank region, by calculating a size needed to place code information created by encoding the additional information and code information created by encoding background information acquired from the non-blank region in the document information;
   said placement region determining unit selecting the non-blank region to be the placement region when the region size is equal to or greater than the determined criterial size.

4. An information processing system comprising:
   a printing device; and
   an image reading device, wherein the printing device comprises:
   a document information receiving unit that receives document information;
   a placement region determining unit that selects a region from the document information to be a placement region where code information is to be placed;
   a code information generating unit that encodes additional information to create code information to be placed within the determined placement region;
   a document information generating unit that generates code-information-bearing document information in which the code information is placed in the placement region of the document information; and
   a printing unit that prints the generated code-information-bearing document information and outputs a code-information-bearing document;
   said placement region determining unit determining a criterial size, associated with the code information created by encoding the additional information, by calculating a size needed to place code information created by encoding the additional information in the document information;

said placement region determining unit determining if there is a blank region in the document information that is equal to or greater than the determined criterial size;

said placement region determining unit selecting the blank region to be the placement region when the size of the blank region is equal to or greater than the determined criterial size;

said placement region determining unit selecting another non-blank region in the document information, when the blank region is less than the determined criterial size, and determining a region size, associated with the non-blank region, by calculating a size needed to place code information created by encoding the additional information and code information created by encoding background information acquired from the non-blank region in the document information;

said placement region determining unit selecting the non-blank region to be the placement region when the region size is equal to or greater than the determined criterial size;

said image reading device including,
- a document information reading unit that reads the code-information-bearing document output by the printing device and generates image information, and
- a code information decoding unit that decodes the code information in the image information and acquires the additional information and the information for the placement region.

5. A method for generating code-information-bearing document information, comprising:

receiving document information;

selecting a region from the document information to be a placement region where code information is to be placed;

encoding additional information to create code information to be placed within the determined placement region;

generating code-information-bearing document information in which the code information is placed in the placement region of the document information;

determining a criterial size, associated with the code information created by encoding the additional information, by calculating a size needed to place code information created by encoding the additional information in the document information;

determining if there is a blank region in the document information that is equal to or greater than the determined criterial size;

selecting the blank region to be the placement region when the size of the blank region is equal to or greater than the determined criterial size;

selecting another non-blank region in the document information, when the blank region is less than the determined criterial size, and determining a region size, associated with the non-blank region, by calculating a size needed to place code information created by encoding the additional information and code information created by encoding background information acquired from the non-blank region in the document information; and selecting the non-blank region to be the placement region when the region size is equal to or greater than the determined criterial size.

6. A non-transitory computer readable recording medium storing a program causing a computer to execute a process for generating code-information-bearing document information, the process comprising:

receiving document information;

selecting a region from the document information to be a placement region where code information is to be placed;

encoding additional information to create code information to be placed within the determined placement;

generating code-information-bearing document information in which the code information is placed in the placement region of the document information;

determining a criterial size, associated with the code information created by encoding the additional information, by calculating a size needed to place code information created by encoding the additional information in the document information;

determining if there is a blank region in the document information that is equal to or greater than the determined criterial size;

selecting the blank region to be the placement region when the size of the blank region is equal to or greater than the determined criterial size;

selecting another non-blank region in the document information, when the blank region is less than the determined criterial size, and determining a region size, associated with the non-blank region, by calculating a size needed to place code information created by encoding the additional information and code information created by encoding background information acquired from the non-blank region in the document information; and selecting the non-blank region to be the placement region when the region size is equal to or greater than the determined criterial size.

* * * * *